(12) United States Patent
Halder et al.

(10) Patent No.: US 9,757,760 B2
(45) Date of Patent: Sep. 12, 2017

(54) ROTARY COATER WITH COATING ELEMENT THAT SUBSTANTIALLY MAINTAINS SPEED DURING USE, AND DEVICE FOR THE ADDITIVE MANUFACTURE OF AN OBJECT USING THE ROTARY COATER

(71) Applicant: EOS GmbH Electro Optical Systems, Krailling (DE)

(72) Inventors: Thomas Halder, Munich (DE); Axel Thoma, Gilching (DE)

(73) Assignee: EOS Gmbh Electro Optical Systems, Krailling (DE)

( * ) Notice: Subject to any disclaimer, the term of this patent is extended or adjusted under 35 U.S.C. 154(b) by 0 days.

(21) Appl. No.: 14/783,294

(22) PCT Filed: Mar. 30, 2014

(86) PCT No.: PCT/EP2014/056387
§ 371 (c)(1),
(2) Date: Oct. 8, 2015

(87) PCT Pub. No.: WO2014/166769
PCT Pub. Date: Oct. 16, 2014

(65) Prior Publication Data
US 2016/0052014 A1    Feb. 25, 2016

(30) Foreign Application Priority Data

Apr. 11, 2013  (DE) .................... 10 2013 206 458

(51) Int. Cl.
*B05C 11/04*        (2006.01)
*B33Y 30/00*        (2015.01)
(Continued)

(52) U.S. Cl.
CPC ........ *B05C 11/044* (2013.01); *B29C 67/0077* (2013.01); *B29C 67/0085* (2013.01);
(Continued)

(58) Field of Classification Search
CPC ......... B22F 2003/1056; B29C 67/0077; B29C 37/00; B29C 162/272; B05C 11/041; B05C 11/044
See application file for complete search history.

(56) References Cited

U.S. PATENT DOCUMENTS 4,919,756 A * 4/1990 Sawdai .................. D21G 3/005
                                              100/174
5,036,760 A * 8/1991 Oozeki ............... B41F 15/0818
                                              101/123
(Continued)

FOREIGN PATENT DOCUMENTS

DE         10235434 A1    2/2004
EP          1234625 A1    8/2002
(Continued)

OTHER PUBLICATIONS

PCT International Preliminary Report on Patenability, dated Oct. 13, 2015; with English Translation; 8 pages.

*Primary Examiner* — Karl Kurple
(74) *Attorney, Agent, or Firm* — Seyfarth Shaw LLP

(57) ABSTRACT

The invention relates to a spin coater for a device for the additive manufacture of an object, having a support that can be connected to the device in a rotable manner about a rotational axis; and a coating element that is coupled to the support and that is suitable for applying or leveling a powder layer on a plane in the device while the support is rotating, the plane running perpendicularly to the rotational axis. The coating element substantially maintains its orientation during the rotational movement of the support within a specified rotational range. The coating element does not substantially
(Continued)

move in a longitudinal direction of the coating element during the rotational movement of the support within a specified rotational range.

8 Claims, 9 Drawing Sheets

(51) Int. Cl.
    *B29C 67/00*              (2017.01)
    *B22F 3/105*             (2006.01)
    *B05C 19/00*            (2006.01)

(52) U.S. Cl.
    CPC ............ *B33Y 30/00* (2014.12); *B05C 19/008* (2013.01); *B22F 2003/1057* (2013.01); *Y02P 10/295* (2015.11)

(56) References Cited

U.S. PATENT DOCUMENTS

| | | | | |
|---|---|---|---|---|
| 5,143,663 A * | 9/1992 | Leyden | ............... | B29C 67/0066 118/423 |
| 5,174,931 A * | 12/1992 | Almquist | ................ | B29C 41/12 118/100 |
| 5,258,146 A * | 11/1993 | Almquist | ................ | B29C 41/12 118/423 |
| 5,582,876 A * | 12/1996 | Langer | .................... | B29C 41/12 264/401 |
| 5,665,401 A * | 9/1997 | Serbin | .................... | B29C 41/12 118/100 |
| 6,010,570 A * | 1/2000 | Motoda | ............... | B05B 15/0208 118/302 |
| 7,239,932 B2 * | 7/2007 | Farnworth | .......... | B29C 67/0066 264/401 |
| 8,132,527 B2 * | 3/2012 | Imamura | ................... | B05C 3/20 118/404 |
| 8,261,687 B2 * | 9/2012 | Kim | ...................... | B01J 37/0215 118/309 |
| 8,453,594 B2 * | 6/2013 | Oldorff | ................. | B05C 1/0813 118/223 |
| 8,667,927 B2 * | 3/2014 | Dupertuis | ............. | B05D 1/002 118/261 |
| 9,156,056 B2 * | 10/2015 | Abe | ..................... | B29C 67/0077 |
| 9,452,567 B2 * | 9/2016 | Syao | .................... | B29C 67/0062 |
| 2002/0152002 A1 | 10/2002 | Lindemann et al. | | |
| 2003/0001313 A1 * | 1/2003 | Krause | .................... | C04B 33/24 264/434 |
| 2006/0108712 A1 | 5/2006 | Mattes | | |
| 2008/0134965 A1 | 6/2008 | Perret et al. | | |
| 2012/0107514 A1 * | 5/2012 | Jeong | .................... | B05B 15/025 427/401 |
| 2012/0291701 A1 * | 11/2012 | Grasegger | ........... | B29C 67/0085 118/300 |
| 2015/0027993 A1 * | 1/2015 | Bruck | .................... | B23K 26/32 219/73.2 |
| 2015/0054204 A1 * | 2/2015 | Tseliakhovich | ..... | B29C 67/0077 264/489 |
| 2015/0376796 A1 * | 12/2015 | Uchiyama | ................ | B01J 19/00 156/345.11 |
| 2016/0136731 A1 * | 5/2016 | McMurtry | ............ | B22F 3/1055 419/53 |

FOREIGN PATENT DOCUMENTS

| | | |
|---|---|---|
| EP | 1925432 A1 | 5/2008 |
| EP | 2399695 A1 | 12/2011 |
| GB | 2450425 A | 12/2008 |

\* cited by examiner

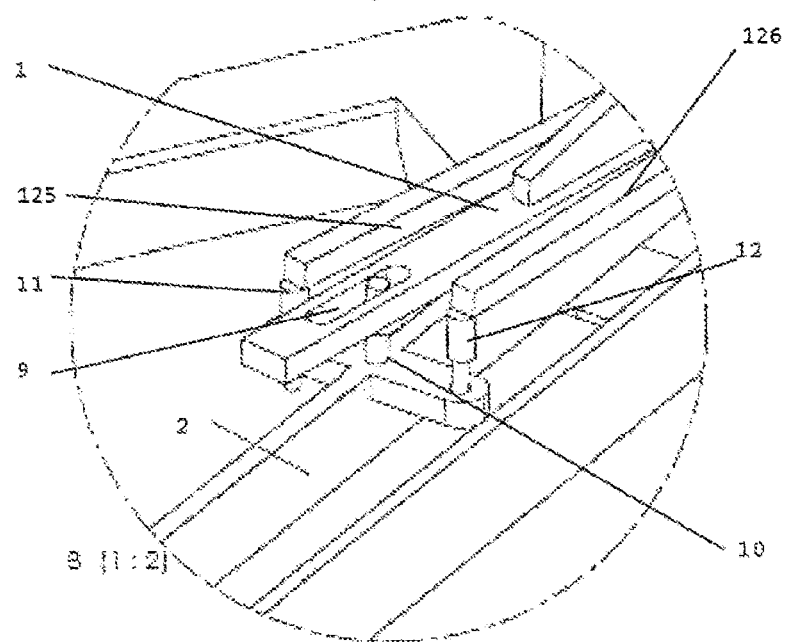

ROTARY COATER WITH COATING ELEMENT THAT SUBSTANTIALLY MAINTAINS SPEED DURING USE, AND DEVICE FOR THE ADDITIVE MANUFACTURE OF AN OBJECT USING THE ROTARY COATER

The presently disclosed embodiments relates to a rotary coater for a device for the additive manufacture of an object, and to a device for the additive manufacture of an object having a rotary coater.

EP 1 925 432 A1 discloses a device for the additive manufacture of an object, having a rotary coater. The rotary coater has a support that can be rotatably connected to the device at an axis of rotation, and a coating element, which is coupled to the support and is designed, during the rotational motion of the support, to deposit or smooth a powder layer in a build field or in a plane perpendicular to the axis of rotation. The mechanical construction of this rotary coater is relatively simple in comparison with a coater that is moved in translation by means of linear guides or rails. By contrast, a coater driven in translation can achieve exceptional component quality.

The present invention has the object of providing a coater for a device for the additive manufacture of an object, and a device for the additive manufacture of an object having the rotary coater, which bring together the advantages of a rotary coater and of a coater driven in translation.

The inventors of the present invention have discovered that component quality can be improved with a homogeneous powder layer. A homogeneous powder layer is in turn achieved when the speed of the coating element is constant over all the points in the build field. Hitherto, due to the orbital motion of the coating element, the speed of the latter was not constant at all the points of the build field. As a consequence, component quality can be improved if the coating element of a rotary coater essentially maintains its orientation during the rotational motion of the support, and if at the same time the coating element executes essentially no motion in its longitudinal direction during the rotational motion of the support.

Further features and expedient aspects of the invention will emerge from the description of exemplary embodiments with reference to the appended drawings, in which.

Figure 1:
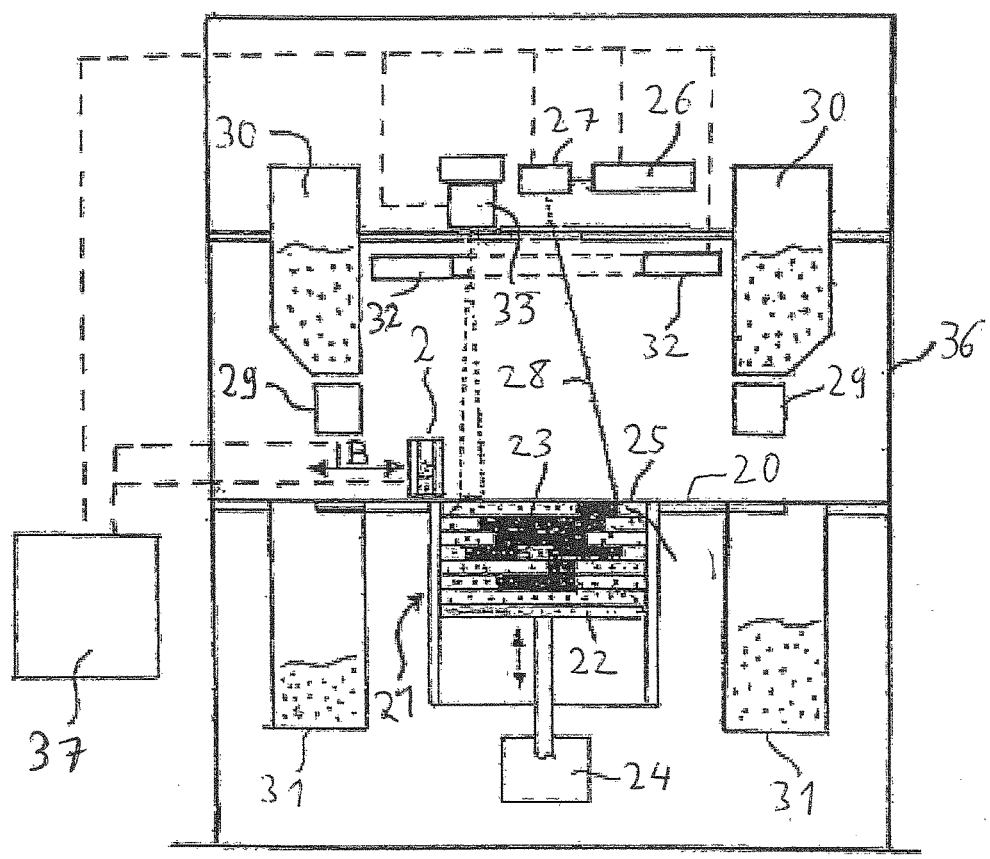
FIG. 1 is a schematic view of a device for the production of a three-dimensional object, according to the present invention.
Figure 2:
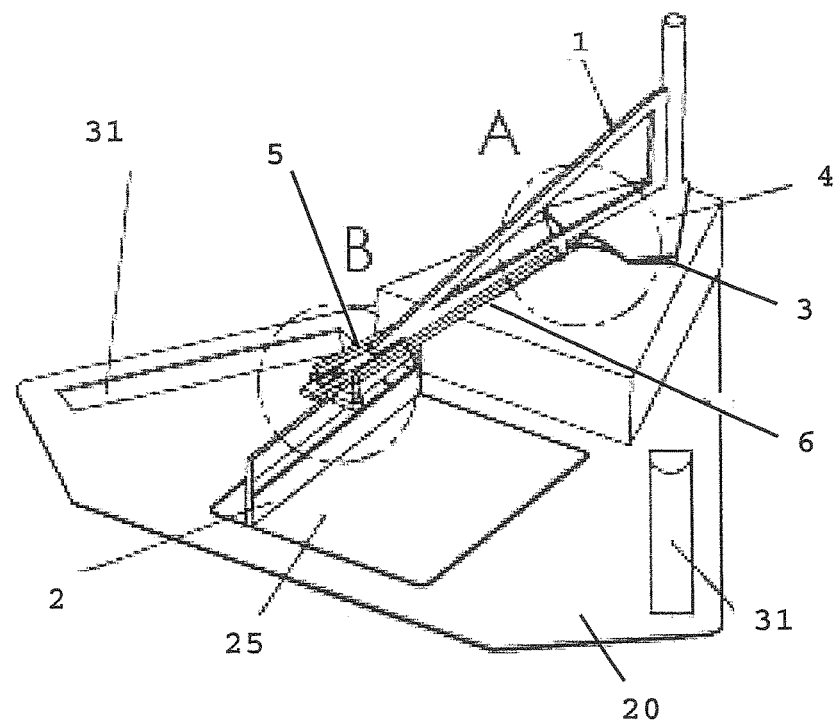
FIG. 2 is a perspective view of the rotary coater according to the present invention.
Figure 5B:
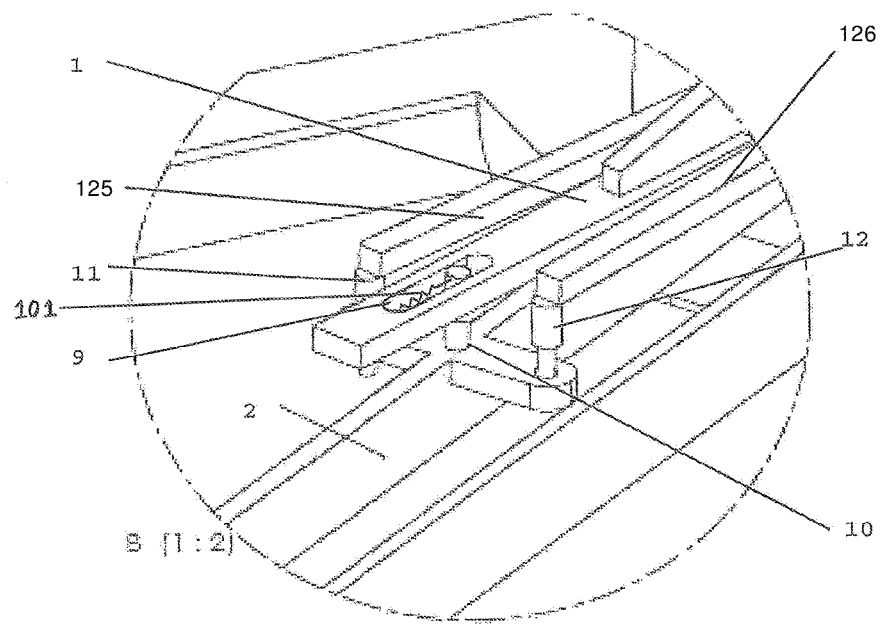
FIG. 5 shows a detail B from FIG. 2.
Figure 5C:
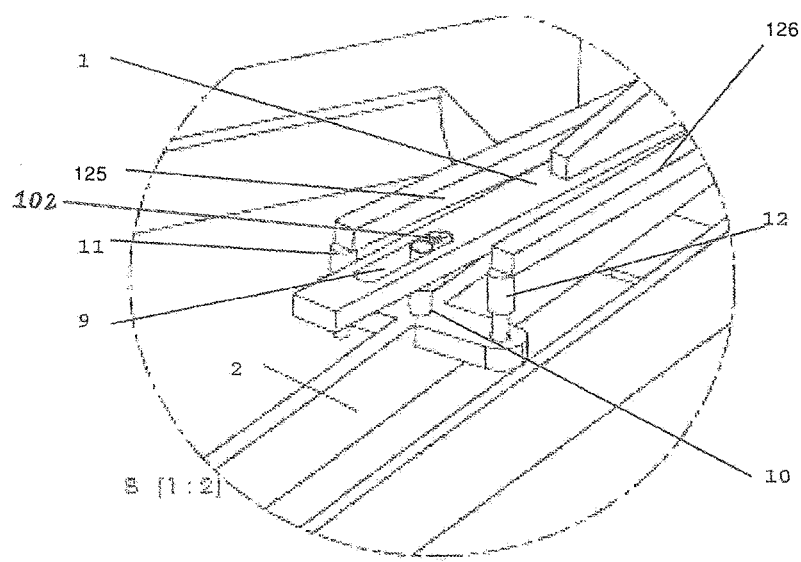
Figure 5D:
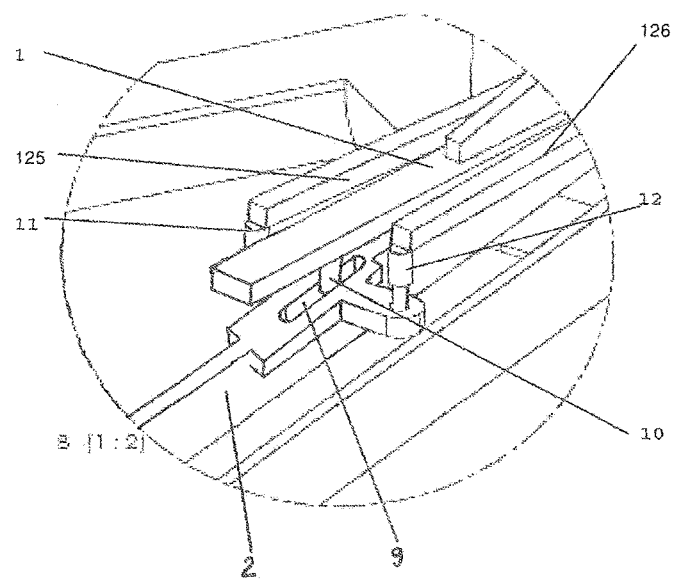
Figure 6:
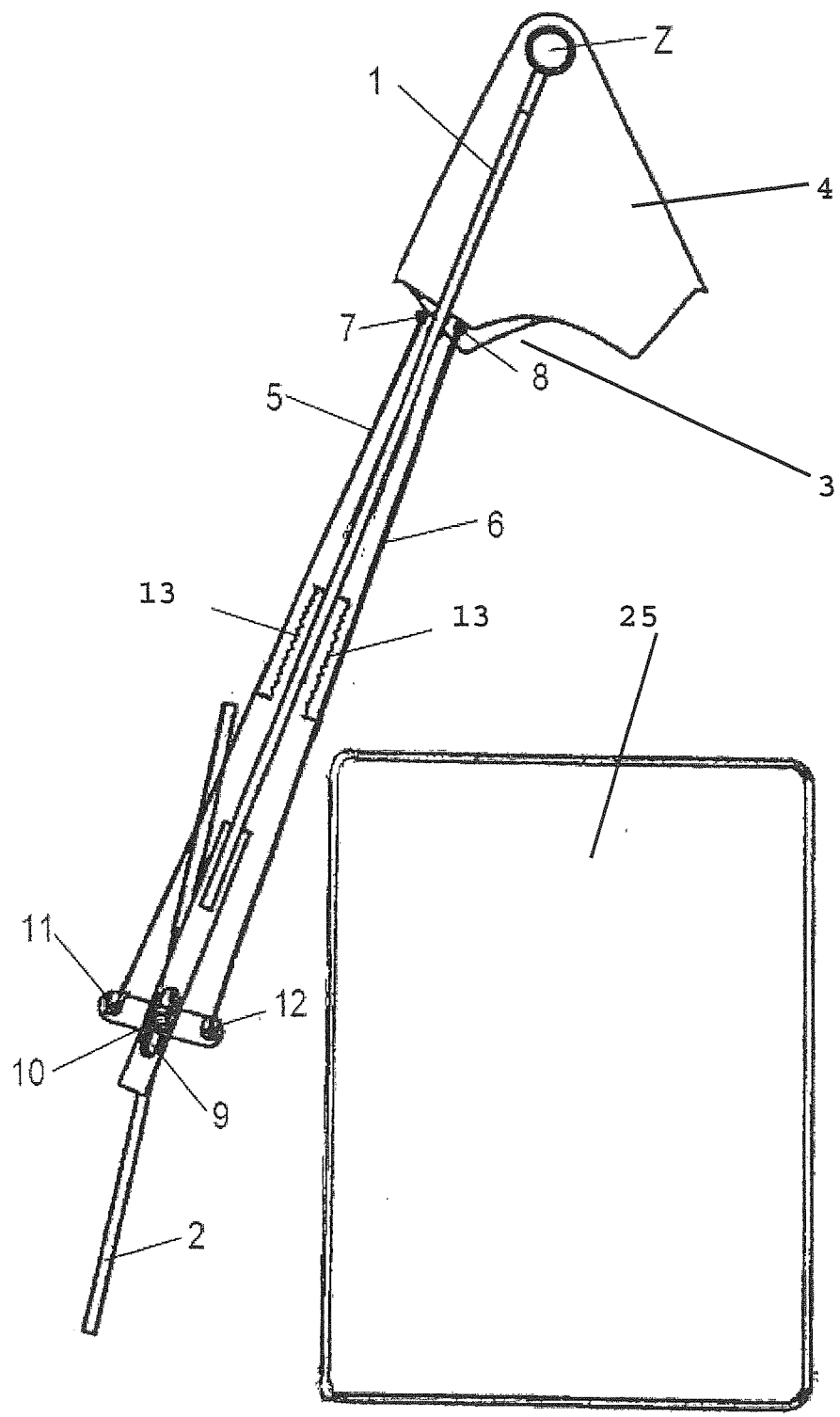
Figure 7:
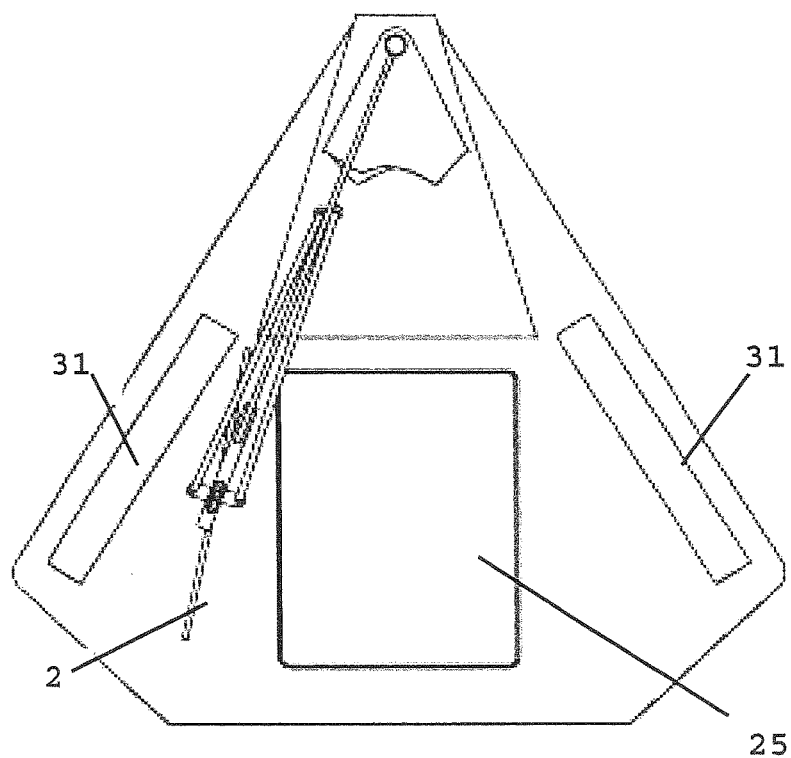
Figure 8:
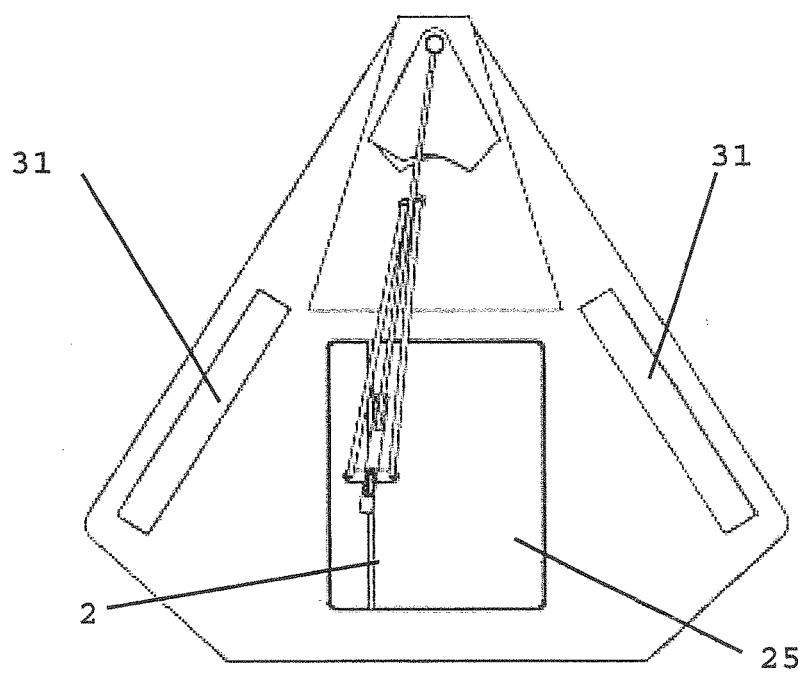

FIG. 5b also shows detail B from FIG. 2;

FIG. 5c also shows detail B from FIG. 2;

FIG. 5d also shows detail B from FIG. 2;

FIG. 6 is a plan view of the rotary coater according to the present invention;

FIG. 7 is a plan view of the rotary coater and a working plate in the device shown in FIG. 1; and FIG. 8 is a plan view of the rotary coater and the working plate in the device shown in FIG. 1;

FIG. 1 shows a laser sintering device as an exemplary embodiment of a device for the production of a three-dimensional object, using the rotary coater according to the invention. The laser sintering device has a container 21 which is open at the top. In the container 21, there is provided a platform 22 for supporting the three-dimensional object 23 which is to be formed. The platform 22 can be raised and lowered in the vertical direction within the container 21 by means of a drive 24. The upper rim of the container 21 defines a build field 25. In the same plane, but radially outside the build field 25, there is arranged a working plate 20. Above the build field 25, there is arranged an irradiation apparatus 26 in the form of a laser which produces a directed laser beam 28 which is deflected onto the build field 25 by means of a deflection device 27. Instead of the laser, it is also possible to use an electron beam which is deflected onto the build field 25 by means of a corresponding deflection device.

There is provided a coating element 2 which deposits and smooths a layer of powdery material, which is to be solidified, onto the surface of the platform 22 or onto a most recently solidified layer. The coating element 2 can consist of a blade made of a metal, a heat-resistant plastic, or a ceramic. The coating element 2 can be moved back and forth over the build field 25 in a direction B.

Two metering devices 29, to the left and right of the build field 25, deposit powder from two powder supply containers 30 onto the working plate 20. Furthermore, there are provided, to the left and right of the build field 25, two overflow containers 31 which can receive excess powder during coating. It is alternatively possible to use just one metering device 29, just one powder supply container 30 and just one overflow container 31.

The device preferably has a heating apparatus 32, arranged above the build field 25, for heating the powder bed and in particular for preheating a deposited but not yet sintered (solidified) powder layer to a working temperature which is suitable for sintering. The heating apparatus 32 takes the form for example of one or more heat lamps, such as infrared lamps, which are arranged above the build field 25 such that the deposited powder layer can be warmed evenly. At a distance above the build field 25, there is provided a temperature measurement apparatus 33, for example in the form of a pyrometer or infrared camera, which serves to measure the temperature of the most recently deposited or uppermost powder layer. The build field 25 is separated from the environment by means of a process chamber 36. It is thus possible to carry out the process in the absence of air, and to prevent oxidation of the powder.

An open- and/or closed-loop control apparatus 37 serves to drive the coating element 2. To that end, the open- and/or closed-loop control apparatus 37 is connected to a drive device (not shown) of the coating element 2. The open- and/or closed-loop control apparatus 37 can preferably also control the platform 22, the heating apparatus 32, the irradiation apparatus 26 and the deflection apparatus 27.

There follows a description of the operation of the laser sintering device.

Initially, the coating element 2 is at its outermost position in the process chamber 36, for example above an opening of the overflow container 31, and the metering device 29 dispenses, onto the working plate 20, a quantity of powder provided from the powder supply container 30.

Then, the coating element 2 is moved parallel to the surface of the build field 25, so as to deposit and smooth, onto the platform 22 or onto a previously solidified layer, a powder layer with a defined thickness.

After the powder layer has been deposited, there follows the selective solidification at points in this layer corresponding to the cross section of the object 23 by irradiation with the laser beam 28 or electron beam, in a manner known per se.

After one layer has been solidified, the platform 22 is lowered by an amount corresponding to the layer thickness, and the above-described steps are repeated until production of the three-dimensional object 23 is complete.

FIG. 2 is a perspective view of the rotary coater according to the present invention. The rotary coater has a support 1 which is rotatably connected to the device at an axis of rotation z. The rotary coater further has the coating element 2 which is coupled to the support 1 and deposits and smooths the powder layer in the build field 25 during the rotational motion of the support 1, wherein the build field 25 is perpendicular to the axis of rotation z. The coating element 2 essentially maintains its orientation during the rotational motion of the support 1 within the build field 25, and the coating element 2 executes essentially no movement in its longitudinal direction during the rotational motion of the support 1 within the build field 25.

FIGS. 3 to 5d show a detail A from FIG. 2, a perspective view of the rotary coater and a detail B from FIG. 2. These figures show a compensation mechanism which effects the above-described motion of the coating element 2. The compensation mechanism of the rotary coater has a first and a second guide plate 3, 4 which are attached to the device and which each have a guide profile. The compensation mechanism of the rotary coater further has a first and a second force-transmitting element 5, 6 which each have one sliding element 7, 8 and which are guided on the support 1 such that, during the rotational motion of the support 1, the sliding element 7 of the first force-transmitting element 5 slides on the first guide profile and the sliding element 8 of the second force-transmitting element 6 slides on the second guide profile and the force-transmitting elements 5, 6 thus slide relative to the support 1. The sliding elements 7, 8 preferably both take the form of rollers.

Figure 3:
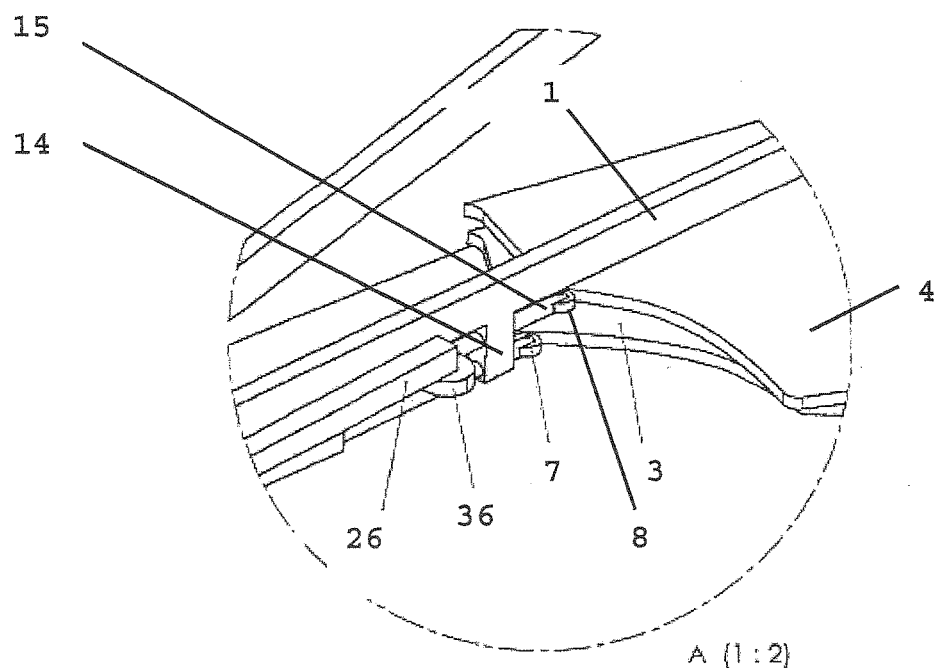
FIG. 3 shows a detail A from FIG. 2.
Figure 4:
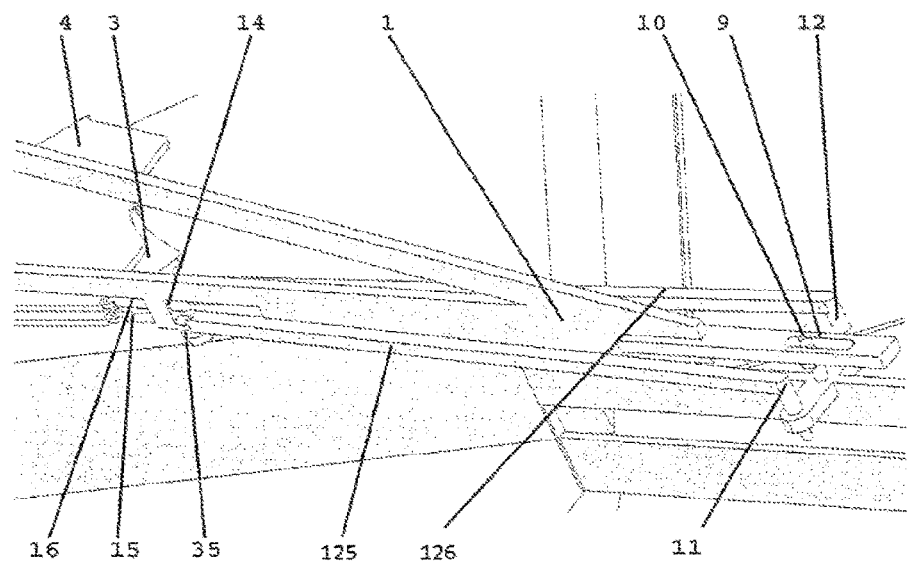
FIG. 4 is a perspective view of the rotary coater according to the present invention.

Preferably, the force-transmitting elements 5, 6 each have, as shown in FIGS. 3 and 4, one tappet 15 and 16 and one rod 125, 126. The tappets 15, 16 are guided by suitable linear guides on the support 1. In the exemplary embodiment shown, the linear guides take the form of through holes which are formed in a vertical projection 14 on the support 1. The tappets 15, 16 of the force-transmitting elements 5, 6 pass one above the other through the through holes.

The sliding elements 7, 8 are arranged at one end of the tappets 15, 16 and, at the other end of the tappets 15, 16, the associated rods 125, 126 are articulated by means of articulations 36, 35.

The support 1 has, at a distance from the axis of rotation z, a slot 9 which is oriented essentially in the direction of the axis of rotation z, and the coating element 2 has a peg 10 arranged essentially parallel to the axis of rotation z, wherein the peg 10 of the coating element 2 is received and can move in the slot 9 of the support 1. Alternatively, it is also possible for the peg to be arranged on the support 1, and for the slot to be accordingly arranged in the coating element 2.

The sliding elements 7, 8 of the force-transmitting elements 5, 6 are each pressed against the corresponding guide profiles by springs 13 shown in FIG. 6. In the exemplary embodiment of FIG. 6, the springs 13 are tension springs; they can alternatively also take the form of compression springs. In the exemplary embodiment shown, the springs 13 are arranged between a corresponding force-transmitting element 5, 6 and the support 1 in order to push or pull the corresponding force-transmitting element 5, 6 toward the axis of rotation z. Alternatively, a spring 101, 102 can be arranged between the peg 10 of the coating element 2 and the support 1 in order to push or pull the peg 10 toward the axis of rotation z.

The first force-transmitting element 5 or the rod 125 thereof is articulated to the coating element 2 via a first articulation 11, and the second force-transmitting element 6 or the rod 126 thereof is articulated to the coating element 2 via a second articulation 12, wherein the first and second articulations 11, 12 are spaced apart from the peg 10 of the support 1 or of the coating element 2.

Although it is not shown in detail, the coating element 2 can be suspended from the support 1 via the peg 10 of the coating element 2. The peg 10 can for example have a T-shaped profile with an upper flange which bears rotatably on the support 1. Alternatively, the coating element 2 can be suspended from the force-transmitting elements 5, 6 via the first and second pivot members 11, 12.

Preferably, the guide plates 3, 4 are each in the form of a cam plate. The guide profile is preferably described by a sine or cosine function which is a function of a length of the support 1 and of a rotation angle range in which the coating element 2 executes the desired movement profile within the build field 25.

This exemplary configuration makes it possible that the coating element 2 essentially maintains its orientation during the rotational motion of the support 1 within the build field 25. Furthermore, the slot 9 and the peg 10 compensate for the lift that the coating element 2 would experience due to the orbital motion. As a result, the coating element 2 executes essentially no movement in its longitudinal direction during the rotational motion of the support 1 within the build field 25. In summary, the effect of the compensation mechanism of the rotary coater is that the coating element 2 does not execute an orbital or circular motion, but rather is moved in translation over a straight movement path within a predetermined rotation range of the support 1.

The motion profile of the coating element 2 is shown in FIGS. 7 and 8.

The starting position of the coating element 2 for a movement path from left to right is located for example above the left-hand overflow container 31, in order to be able to transport, to the build field 25, the powder dispensed from the metering device 29. The coating element 2 is initially parallel with the axis of the overflow container 31.

During the rotational motion of the support 1 toward the right-hand edge of the build field 25, the coating element 2 orients itself parallel to the left-hand edge of the build field 25 in order to then pass over the build field 25 in a linear motion.

In further motion, the coating element 2 orients itself parallel with the axis of the right-hand overflow container 31. The motion path of the coating element 2 is complete when the coating element 2 is for example above the center of the right-hand overflow container 31 at a starting position for the travel from right to left.

The invention has been described for a laser sintering device in which a laser 26 is used as the radiation source. However, it is also conceivable to use any other radiation source by means of which an electromagnetic or particle beam can be introduced into the powdery construction material. It is thus possible for example to use a radiation source for incoherent light radiation, for infrared radiation, for X-ray radiation or for electron radiation. Accordingly, it is necessary to use a powdery construction material which can be solidified with the respective radiation. The rotary coater is accordingly suitable for use not only in the context of laser sintering but also in the context of all powder-based additive manufacture methods where a material or a powder material that is solidified by an energy beam is used. The rotary coater can also be used in the context of laser melting devices. The device for the production of a three-dimensional object can also be a laser melting device or a device with masked irradiation.

It is possible to create multiple coating elements 2 for one or more build fields 25. Then, the various build fields 25 can be charged separately with different powdery materials.

The supply of the powder to the coating element 2 has been described such that it is carried out from above by means of metering devices 29 from supply containers 30. It is however also possible to supply the powder from below from a supply container. It is in particular possible to provide a supply container which is open at the top and which has a movable floor, wherein the floor is raised in order to supply powdery material.

The scope for protection is not limited to the exemplary embodiments shown, but rather encompasses further changes and modifications in so far as these are within the scope defined by the accompanying claims.

The invention claimed is:

1. A coater for a device for additive manufacture of an object, comprising:
    a support rotatably connected to the device at an axis of rotation;
    said support rotatably movable about said axis of rotation within a build field; the build field being in a plane perpendicular to the axis of rotation;
    a coating element coupled to the support and configured to smooth a powder layer in the build field during a rotational motion of the support,
    a first guide plate and a second guide plate attached to the device at a location where the support is connected to the device at the axis of rotation, the first guide plate having a first guide profile and the second guide plate having a second guide profile;
    a first force-transmitting element and a second force-transmitting element respectively having a first sliding element and a second sliding element and which are guided on the support such that, during the rotational motion of the support, the first sliding element of the first force-transmitting element slides on the first guide profile and the second sliding element of the second force-transmitting element slides on the second guide profile and the force-transmitting elements thus slide relative to the support;
    wherein the coating element is configured to maintain its orientation during the rotational motion of the support within the build field; and
    wherein the coating element is configured to move in translation over a straight movement path within a predetermined rotational range of the support.

2. The coater as claimed in claim 1,
    wherein the support has, at a distance from the axis of rotation, a slot that is oriented in the direction of the axis of rotation or a peg arranged parallel to the axis of rotation;
    the coating element having a peg arranged parallel to the axis of rotation or a slot which is oriented in the direction of the axis of rotation, wherein the peg of the coating element is received and can move in the slot of the support or the peg of the support is received and can move in the slot of the coating element;
    the first force-transmitting element is applied to the coating element via a first pivot member and the second force-transmitting element is applied to the coating element via a second pivot member, and
    the first and second pivot members are spaced apart from the peg of the support or of the coating element.

3. The coater as claimed in claim 2, wherein the coating element is suspended from the support via the peg of the support or of the coating element.

4. The coater as claimed in claim 2, wherein the guide plates are cam plates.

5. The coater as claimed in claim 4, wherein at least one of the guide profiles are defined by a sine or cosine function that is a function of a length of the support and of a rotation angle range in which the coating element executes a movement profile.

6. A device for the additive manufacture of an object comprising the coater according to claim 1.

7. An apparatus for applying successive layers of powder material in a build field of a device for additive manufacture of an object, comprising:
    a support to which is coupled a coating element having a length extending in a longitudinal direction over the build field, the coating element being adapted to move and thereby smooth a layer of powder supplied to the build field over the build field in the course of additive manufacture;
    the support being mounted so as to rotate about an axis where the axis is perpendicular to a plane defining the build field, with the coating element moving over the build field from a first edge of the build field to a second edge of the build field, the coating element being coupled to the support during a rotational motion of the support within the build field;
    a compensation mechanism communicating with the coating element, the compensation mechanism including at least a first guide plate having a first guide profile and at least a first force-transmitting element having a first sliding element which are guided on the support such that, during the rotational motion of the support, the first sliding element of the first force-transmitting element slides on the first guide profile, moving the coating element relative to the support so as to maintain the coating element in a straight movement path relative to the build field without movement of the coating element in the longitudinal direction during the rotational motion of the support within the build field.

8. The coater as claimed in claim 2, wherein the coating element is suspended from the force-transmitting elements via the first and second pivot members.

* * * * *